Feb. 19, 1924.  1,484,401
G. M. LUDLOW
INDICATOR LINE FOR CYLINDRICAL CHART SCALES
Filed July 15, 1922  2 Sheets-Sheet 1
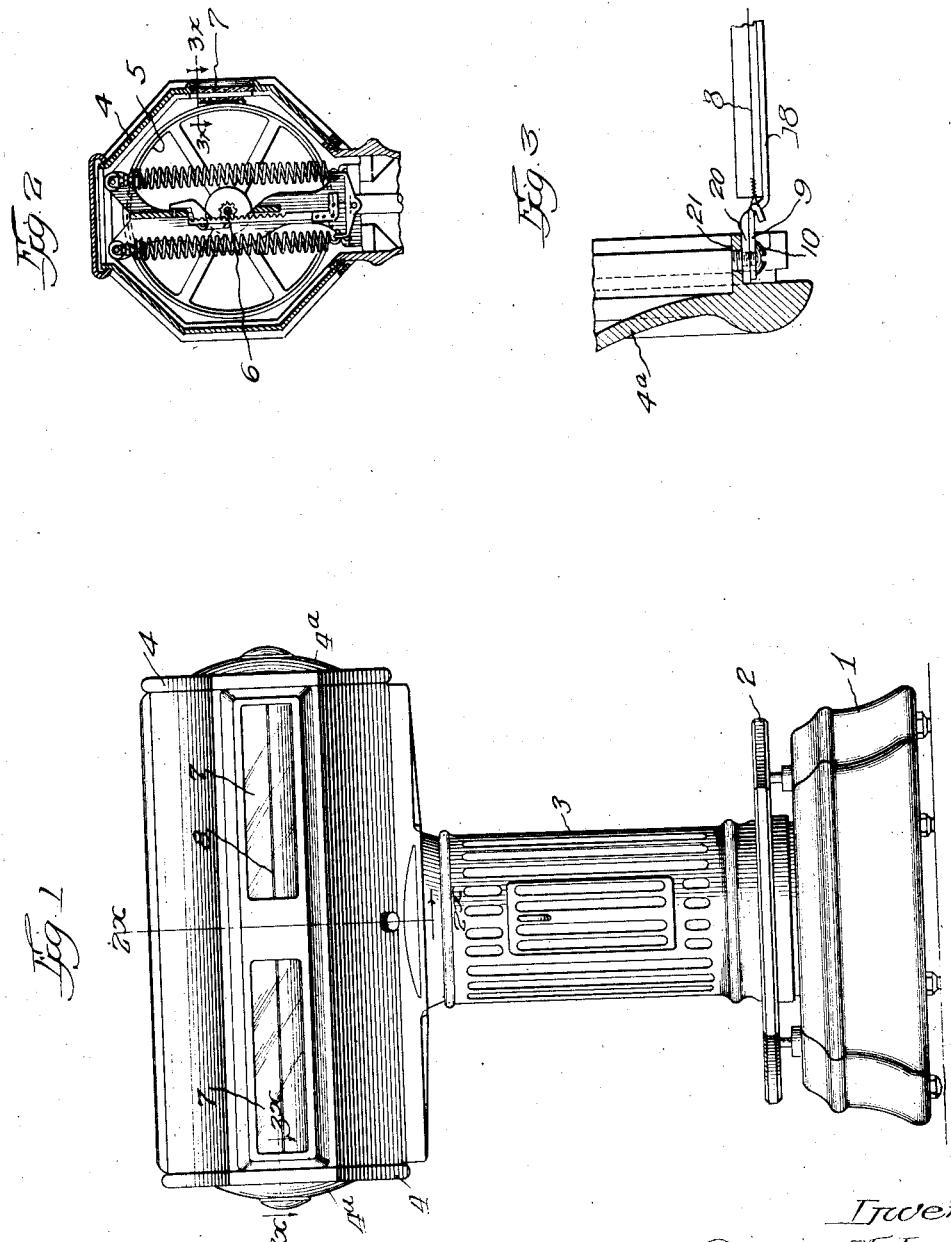

Feb. 19, 1924. 1,484,401
G. M. LUDLOW
INDICATOR LINE FOR CYLINDRICAL CHART SCALES
Filed July 15, 1922 2 Sheets-Sheet 2
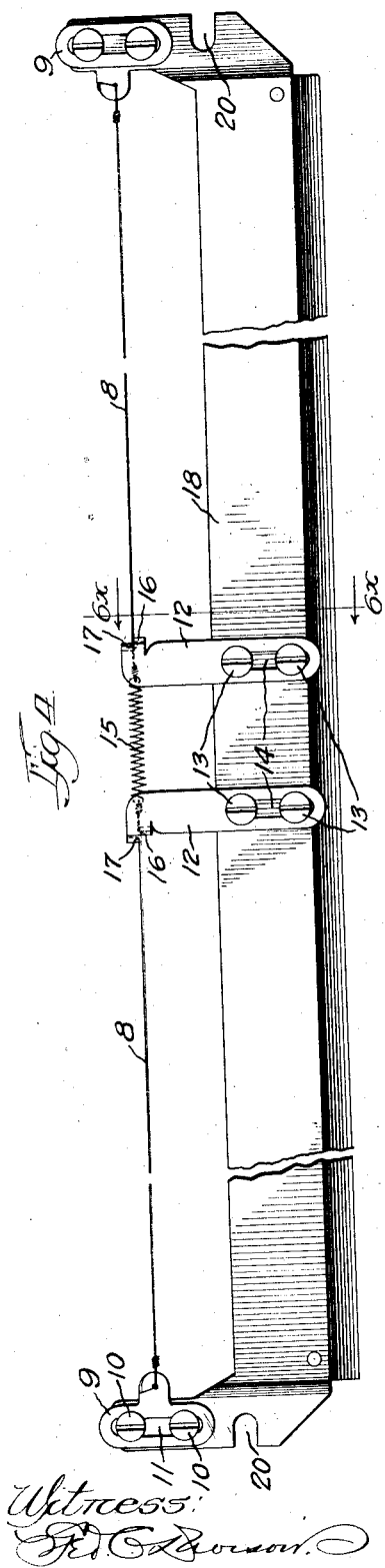
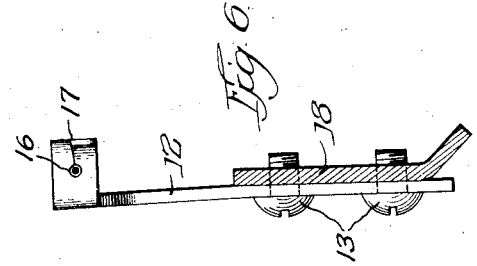
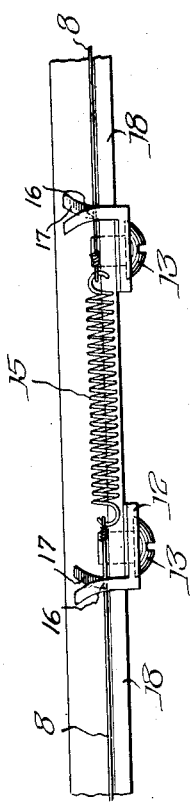
Inventor
George M. Ludlow Patented Feb. 19, 1924.

1,484,401

UNITED STATES PATENT OFFICE.

GEORGE M. LUDLOW, OF EVANSTON, ILLINOIS, ASSIGNOR TO SANITARY SCALE COMPANY, OF CHICAGO, ILLINOIS, A CORPORATION OF ILLINOIS.

INDICATOR LINE FOR CYLINDRICAL CHART SCALES.

Application filed July 15, 1922. Serial No. 575,371.

*To all whom it may concern:*

Be it known that I, GEORGE M. LUDLOW, a citizen of the United States, residing at Evanston, in the county of Cook and State of Illinois, have invented certain new and useful Improvements in Indicator Lines for Cylindrical Chart Scales, of which the following is a specification.

This invention relates to means for providing a line in position to cooperate with the indicia upon the revolving chart of a scale in order to facilitate accurate reading of movements imparted to the chart in weighing operations; and particularly to indicator lines for use in connection with charts that are subdivided into two sections.

The object of the invention is to provide a mounting for the wire or other line-forming member which will permit each portion of the line to be brought into accurate parallelism with the portion of the chart with which it is to cooperate, even though the individual chart members should be out of alignment.

Primarily, the invention consists in providing means for supporting an indicator line in position to be observed in association with markings upon a chart or charts, and to permit the ends of the line and also the intermediate portion thereof to be adjusted independently one of another in the direction of chart movement, the means for adjusting the intermediate portion of the line comprising a plurality of shifting elements movable independently so that each portion of the line may be shifted both bodily and angularly in a plane tangential to the chart.

The invention further consists in details of construction of the line supporting and shifting elements.

In the accompanying drawings, in which the preferred embodiment of the invention is shown by way of illustration—

Figure 1 is a front elevation of a scale having an indicator line of the kind to which the present invention relates.

Figure 2 is a section on the line $2^x$—$2^x$ of Figure 1;

Figure 3 is a detail view in horizontal section on the line $3^x$—$3^x$ of Figure 1;

Figure 4 is a front elevational view on an enlarged scale showing the complete mounting detached from the scale;

Figure 5 is a top plan view of the intermediate portion of Figure 4; and

Figure 6 is a section on line $6^x$—$6^x$ of Figure 4.

1 represents the base, 2 the load receiving platform, 3 the column, and 4 the chart housing of a spring balanced cylinder chart scale. Within the housing 4 is a chart 5 revolving upon shaft 6 in order to bring calibrations or indicia upon its surface in position to be observed through windows 7. In order to provide a reading line or indicator line for use in connection with a chart such as described, it has been customary to provide a wire 8 across the inside of the windows 7. But difficulty has been experienced in positioning the wire 8 so that it would register accurately with the alignment of markings upon the chart; and particularly has this difficulty been experienced where the chart was divided into two separate areas of markings developed by the application of printed or engraved sheets circumferentially upon the chart members. If the charts were applied otherwise than with absolute accuracy, an indicator wire might be in registry with the markings at one end and out of registry with the other; or the separately applied chart sheets might have their lines of figures slightly out of parallel, or out of alignment, and in that instance the indicator wire would read accurately with a portion of the line and inaccurately with the remainder thereof.

The present invention overcomes the difficulties referred to by attaching its extreme ends to vertically adjustable clips 9 secured in position through the medium of screws 10 passing through slots 11 in said clips; also by providing independently adjustable supporting posts 12 for the intermediate portion of the wire 8, said posts being secured, for instance, by means of screws 13 passing through slots 14 in said posts. By securing the wire 8 at its extremities and at two intermediate points through vertically adjustable means, the wire is not only adapted to be raised and lowered bodily at will to bring it with accuracy upon the desired reading line, but one portion of said wire can be so adjusted vertically relatively to the other portion thereof; moreover, the wire may be given a slight inclination to insure accurate coincidence with the line of characters upon the chart, and each portion thereof may be given the desired inclination relatively to the other portion or be bodily offset therefrom vertically as may be desired.

In order to compensate for changes in length of the wire required for different positions to which its respective halves may be adjusted, a tension spring 15 is inserted between severed ends of the wire at the middle thereof, and this spring tends to hold the wire taut at all times. The supporting posts 12 receive the wire 8 through the medium of eyes 16 which afford vertical support for the wire without restricting its movement longitudinally, thus leaving the spring 15 free to take up slack in the wire or yield to stretching thereof at all times. The eyes 16 are preferably split, as shown at 17, in order to admit the wire into the eyes without the necessity of threading it through or disconnecting the portions of the wire from the spring 15.

While the clips 9 and intermediate supporting posts 12 might be mounted directly upon appropriate portions of the chart housing, they are preferably mounted upon a bar 18 which is removably attached to the chart housing, as, for instance, through the medium of screws, passing through slots 20 (see Figure 4) and entering flanges 21 in the end walls 4ª of the chart housing.

I claim:

1. In an indicator for scales having a plurality of aligned charts, a single line adapted to extend across and present different portions thereof in reading relation to the respective charts, and independent means for adjustably fixing the direction of each portion of said line with respect to the chart to which it is related.

2. In an indicator for scales having a plurality of aligned charts, a single line adapted to present its different portions in reading relation to the indicia of the respective charts, means for selectively positioning said line in relation to chart indicia at ends of charts that are remote from each other, and means for independently positioning intermediate portions of said line relatively to indicia at ends of said charts that are adjacent to each other.

3. An indicator for movable chart scales, comprising a line, means for anchoring the respective ends of said line with independent adjustment of said ends in the direction of chart movement, and means for supporting an intermediate portion of said line also adjustable in said direction; said last-named means comprising two independently adjustable line supporting units.

4. In an indicator for scales having a plurality of aligned charts, a single line adapted to present its different portions in reading relation to the indicia of the respective charts, adjustable means for positioning said line at ends of charts that are remote from each other, and means for independently positioning intermediate portions of said line at and relatively to ends of said charts that are adjacent to each other; said line being constructed with longitudinal resiliency in the portion thereof which lies between said intermediate portions thereof.

5. In an indicator for scales having a pair of aligned charts, a longitudinally resilient line serving for both said charts, line-end supports adjacent the outer ends of the charts adapted to hold the line taut, and an intermediately positioned line deflector for each inner end of a chart subdividing the line into sections corresponding to the respective charts without interrupting the continuity of the line; each line-deflector coacting with a corresponding line-end support to establish direction of the included section of the line, independently of establishment of direction of the other section of the line.

6. An indicator for movable chart scales, comprising a line, means for anchoring the ends of said line, a plurality of independently adjustable supports for engaging said line at points intermediate of its ends, and a resilient element introduced into the line between said supports.

7. In an indicator for scales, a bar, an indicating line, means for anchoring the ends of said line to said bar, and means mounted on said bar engaging and independently fixing the positions of intermediate portions of said line.

Signed at Chicago, Illinois, this 29th day of June, 1922.

GEORGE M. LUDLOW.